Patented Dec. 14, 1948

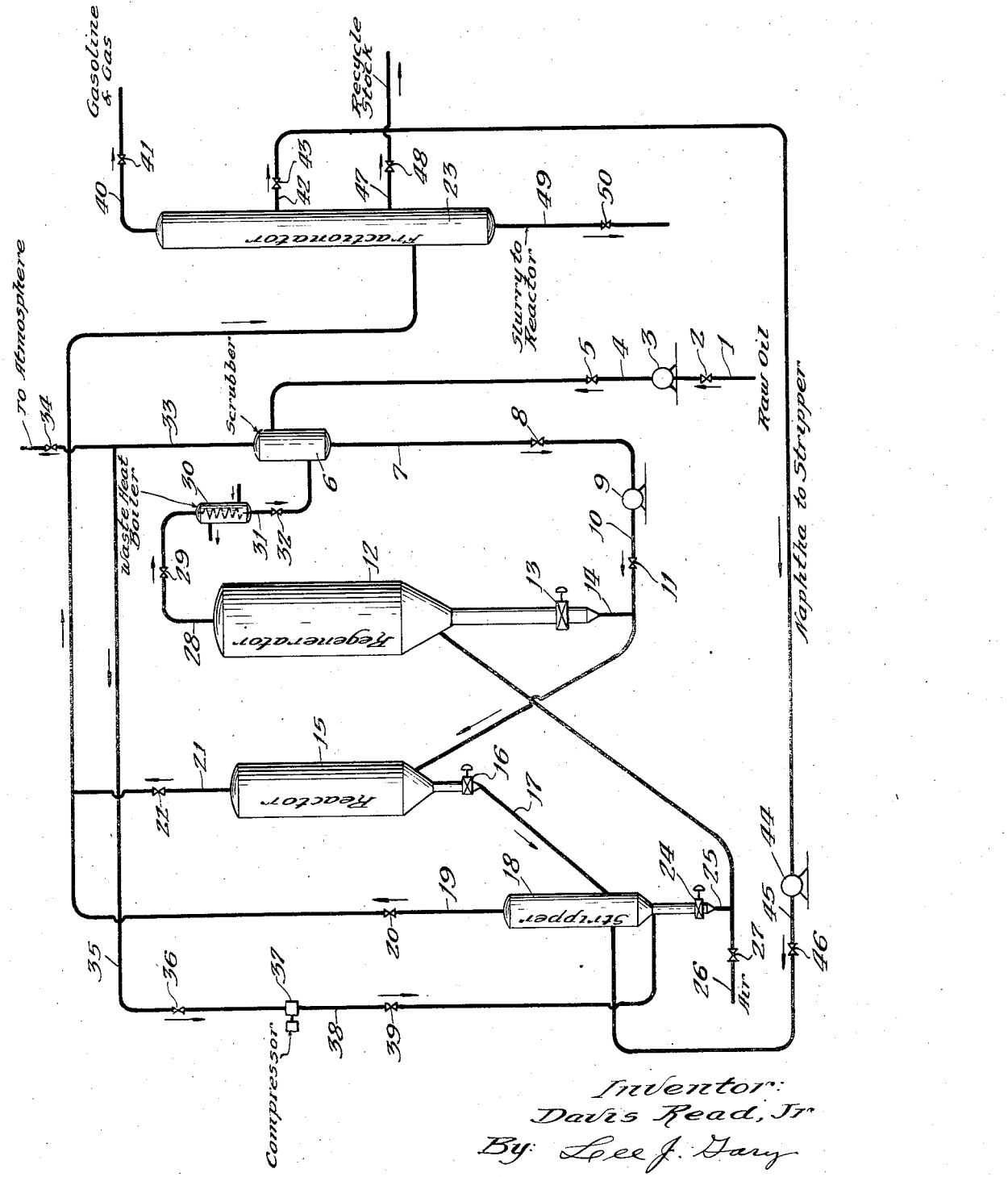

2,456,148

UNITED STATES PATENT OFFICE 2,456,148

STRIPPING OF SPENT CATALYST IN HYDROCARBON CONVERSION PROCESSES

Davis Read, Jr., Downers Grove, Ill., assignor to Universal Oil Products Company, Chicago, Ill., a corporation of Delaware Application May 25, 1945, Serial No. 595,715

7 Claims. (Cl. 196—52)

This invention relates to the catalytic conversion of hydrocarbons and is more particularly concerned with an improved method of removing residual hydrocarbons from catalysts which have been deactivated by the deposition of carbonaceous materials on the surface prior to the regeneration of the catalyst.

In recent years many catalytic processes have been employed for the conversion of hydrocarbons which utilize catalysts which gradually become contaminated or deactivated by the deposition of carbonaceous material on the catalyst surfaces. It is the usual procedure to regenerate or reactivate these catalysts by burning off the carbonaceous deposit. However, most of these catalytic substances, either synthetic or natural, are somewhat thermophobic and excessively high temperatures cause a deterioration of their catalytic activity, thereby shortening the period of useful life. Various regeneration techniques have been developed to prevent excessive temperature during regeneration, the most common being the use of an inert diluent along with the regenerating gas, thereby increasing the heat capacity of the regenerating medium and providing a means for regulating the temperature rise. In all of these regeneration operations it is a practice to remove a portion of the residual oil retained on the catalyst by absorption, prior to contacting the catalytic material with the regenerating medium. This removal of residual oil performs two functions, first, it decreases the amount of combustible material entering the reaction zone thereby effecting a corresponding decrease in the amount of regenerating medium required and, secondly, because of the decreased amount of combustible material present a lower temperature is obtained in the regenerating zone. Further, the residual oils removed from the catalyst prior to regeneration may be recovered instead of being burned in the regeneration zone, thus, improving the economics of the hydrocarbon conversion process.

The methods ordinarily employed in removing the residual oils from the catalyst usually entail the use of some medium, such as steam, which displaces the oil from the catalyst surface, or the use of some other inert material such as combustion gases which are very low in oxygen concentration. Either of these types of removal have disadvantages inherent in the particular medium employed. It has been found that the use of steam tends to permanently decrease the catalyst activity making it necessary to change or add fresh catalyst at frequent intervals to maintain a high conversion rate in the operation. Combustion gases have not been found to be particularly effective for the removal of high boiling hydrocarbon oils and can only be used satisfactorily when the materials retained on the catalyst have a relatively low boiling point.

It is an object of the present invention to provide a means for removing the residual oils retained on the surfaces of the deactivated catalyst prior to regeneration with a medium which will effectively remove these residual oils without causing any deleterious effect on the catalyst activity.

In one embodiment the present invention consists of a process for the removal of residual oils retained on catalyst surfaces prior to regeneration by subjecting the catalyst to contact with a naphtha fraction under conditions such that a substantial portion of the residual oils are replaced by the naphtha.

The method herein disclosed of removing residual oils from catalyst surfaces may be satisfactorily employed in various hydrocarbon conversion processes, for example catalytic cracking of high boiling oils to form low boiling materials, catalytic reforming of straight-run gasolines, catalytic dehydrogenation of aliphatic or cycloparaffinic and cycloolefinic hydrocarbons, and is particularly useful in operations wherein high boiling oils such as topped crude or gas oils are converted into motor fuels having high antiknock properties by the catalytic cracking thereof in the presence of solid synthetic or natural catalysts.

The catalysts which may be employed in the process of the present invention comprise silica and alumina composites either synthetic or natural, silica-alumina composited with one or more of the oxides of boron, magnesium, titanium, thorium, and zirconium. The above catalyst composites are ordinarily employed in catalytic cracking operations. Catalysts which are effective for dehydrogenation may comprise compounds and particularly the oxides of chromium, molybdenum, tungsten and vanadium either alone or in admixture with one another, or solid supporting materials such as silica, alumina, magnesium oxide, titanium oxide, zirconium oxide and similar refractory supporting materials. These catalysts may be prepared by any method well-known to those skilled in the art including precipitation of a purified supporting material such as silica or alumina and the impregnation of the supporting material with a decomposable compound followed by calcination to produce the desired composite or by the coprecipitation of two or more of the materials, for example, silica and alumina. The catalyst may be employed in powdered, pelleted or spherical shapes.

The operating conditions to be employed in the present invention will be dependent upon the type of reaction desired and the particular catalyst employed. Ordinarily in cracking operations the temperature will be within the range of 700 to 1100° F. at a pressure of from substantially atmospheric to mildly superatmospheric to about 200 pounds or more and a weight ratio of catalyst to hydrocarbon oil within the range of about 0.1:1 to 25:1. In dehydrogenation operations the temperature will be substantially the same as that employed in the cracking operation. However, the pressure in the dehydrogenation operations, particularly when effecting the reformation of gasolines or the formation of aromatic hydrocarbons in the presence of hydrogen or hydrogen containing gases, will be substantially higher, ordinarily within the range of about 200 to 1000 pounds per square inch or more. In dehydrogenation operations in the absence of added hydrogen, the pressure will vary from slightly superatmospheric to about 200 pounds per square inch.

The naphtha fractions which may be employed to displace the high boiling hydrocarbon oils from the catalyst may consist of naphtha fractions produced in the operation or may be obtained from extraneous sources, such as cracked or straight-run gasolines. Although the exact reason for an improved stripping efficiency of heavy oils by the use of naphtha is not known it is reasonable to assume that a part of this action is due to the solvent effect of the naphtha on the higher boiling oils which is not present when employing mediums such as steam or combustion gases. If desired, after the removal of the higher boiling oils by the use of the naphtha, the naphtha can also be removed quite readily by the use of combustion gases, thus, supplying a catalyst to the regeneration zone which has a minimum amount of carbonaceous material thereon.

The features of the present invention will be more apparent from the following description of the attached diagrammatic drawing which illustrates in conventional side elevation one type of apparatus in which the objects of the present invention may be accomplished. However, it is not intended that this description place any undue limitation on the generally broad scope of the invention.

For simplification the description of the drawing is limited to an operation wherein a topped crude is catalytically cracked to a high octane gasoline.

Referring to the drawing, the hydrocarbon charge, for example a Mid-Continent topped crude, is introduced through line 1 containing valve 2 into pump 3 which discharges through line 4 containing valve 5 into scrubber 6 wherein it is contacted with regenerating gases obtained as hereinafter set forth. The primary function of scrubber 6 is to remove minor amounts of catalyst entrained in the regenerating gases leaving the regenerator. The topped crude containing small amounts of catalyst is withdrawn from scrubber 6 through line 7 containing valve 8 into pump 9 which discharges through line 10 containing valve 11 and picks up catalyst from regenerator 12 which flows through slide valve 13 and line 14 into line 10. The catalyst to oil weight ratio in line 10 will be dependent upon a number of factors, for example, the temperature desired in reactor 15, the temperature of the catalyst leaving regenerator 12, etc., but will ordinarily be within the range of from approximately 2:1 to 25:1. As shown in the drawing no preliminary heating is given the charge oil but upon mixing with the hot regenerated catalyst from regenerator 12 in line 10 substantially all of the gas oil is vaporized and the mixture being introduced into reactor 15 consists of a suspension of finely divided catalyst and hydrocarbon vapors. When desired, however, the charge oil may be preheated by well-known means, not illustrated.

Reactor 15 may comprise a large cylindrical vessel preferably baffled to insure effective contact of the catalyst and the hydrocarbon. The oil and catalyst suspension pass through a distributing plate to avoid channeling within the catalyst bed maintained in reactor 15. The catalyst within reactor 15 is maintained in two distinct phases, the lower phase being relatively dense having an apparent bulk density of about 25 to 35 pounds per cu. ft. and the density of the light phase being approximately 5 pounds per cu. ft. or slightly more. The densities of these particular phases will be dependent upon the velocity of the hydrocarbons through the catalyst body, the type of catalyst employed and the average particle size of the catalyst. The velocity of the hydrocarbon througth the catalyst in reactor 15 is such that the catalyst within the reactor is maintained in suspension and resembles a liquid in some of its physical properties, attaining a distinct level in the reactor. The weight hourly space velocity within reactor 15 measured as weight of hydrocarbon per weight of catalyst per hour will vary depending upon the particular reaction desired but will ordinarily be within the range of about 0.1 to 5 and preferably 0.5 to 2. The catalyst which is to be regenerated is withdrawn from the dense phase in reactor 15 to valve 16 into line 17 into stripper 18 wherein it is contacted with a naphtha fraction obtained as hereinafter set forth which removes substantially all of the high boiling residual oils retained upon the catalyst prior to regeneration. The excess naphtha vapors and residual oils which have been removed from the catalyst are withdrawn from stripper 18 through line 19 containing valve 20 and commingled with reaction products removed from reactor 15 through line 21 containing valve 22 and introduced into fractionator 23. To insure as complete a stripping of hydrocarbons from the catalyst as possible a stream of substantially oxygen-free combustion gases obtained as hereinafter set forth is introduced into the stripper below the inlet line of the naphtha stripping medium. These combustion gases also pass out through line 19 containing valve 20 into fractionator 23. In many cases it may not be necessary to employ the auxiliary combustion gas stripping step since the residual amount of naphtha is not excessive. The stripped catalyst is withdrawn from stripper 18 through control valve 24 into line 25 and picked up by a stream of air introduced into the system through line 26 containing valve 27. This catalyst is carried through line 26 into regenerator 12 wherein the combustible material is removed by oxidation. The combustion gases substantially free of oxygen are withdrawn from regenerator 12 through line 28 containing valve 29 through waste heat boiler 30 wherein a substantial portion of the heat content of the combustion gases is removed by indirect heat exchange with water to form steam which can be utilized in some other part of the process. The cooled combustion gases leave waste heat boiler 30 through line 31 containing valve 32 and are introduced into scrubber 6 as hereinbefore set forth. Any catalyst entrained in these combustion gases are removed in scrubber 6 by the scrubbing action of the gas oil charge. The catalyst free combustion gases leave scrubber 6 through line 33 and a portion thereof is vented to the atmosphere through valve 34. A portion of this combustion gas may be directed through line 35 containing valve 36 into compressor 37 which discharges through line 38, valve 39 into stripper 18 to be utilized to strip the naphtha retained on the catalyst during the preliminary stripping operation. The gasoline and gas are separated from the reaction products in fractionator 23 and withdrawn overhead through line 40 containing valve 41 and sent to the usual separating systems in which the gasoline is separated from the gases and collected as a product of the reaction. The light gases containing isoparaffins and olefins may be utilized in polymerization or alkylation operations. The naphtha fraction to be employed in the stripping operation is withdrawn as a side cut from fractionator 23 through line 42 containing valve 43 into pump 44 which discharges throuugh line 45 containing valve 46 into stripper 18. Another fraction comprising hydrocarbons boiling higher than the naphtha fraction may be withdrawn from the lower portion of fractionator 23 through line 47 containing valve 48 and further treated either catalytically or thermally to augment the total product of gasoline hydrocarbons. A minor proportion of the higher boiling hydrocarbons containing catalyst suspended therein is withdrawn from the bottom of fractionator 23 and recycled to reactor 15 through line 49 containing valve 50.

The above description of the drawing has been limited to a process wherein the catalyst is employed in a fluidized condition in the reaction zone. However, it is not intended that the broad application of the present invention be limited to this type of operation. The method of stripping herein disclosed is equally applicable to operations wherein the catalyst is disposed within the reaction zone in fixed bed relationship to the incoming reactants, or to an operation in which a relatively compact bed of catalyst is passed downwardly through the reaction zone and the hydrocarbon reactants are passed through the reaction zone either concurrently or countercurrently to the moving mass of catalyst.

I claim as my invention:

1. A hydrocarbon conversion process which comprises subjecting a hydrocarbon charge to conversion conditions in the presence of a solid catalyst in a reaction zone; introducing the resultant conversion products into a fractionation zone and therein separating a naphtha fraction; withdrawing contaminated catalyst from the reaction zone and introducing the same into a stripping zone; contacting said naphtha fraction with said contaminated catalyst in said stripping zone to displace high boiling hydrocarbons from the contaminated catalyst; passing thus stripped catalyst in countercurrent contact with substantially oxygen-free combustion gases in a lower portion of said stripping zone to remove absorbed naphtha from the catalyst; separately withdrawing from said stripping zone a stripped catalyst stream and a stream comprising naphtha fraction, displaced high boiling hydrocarbons and combustion gases; introducing the last named stream into said fractionation zone without passage thereof through said reaction zone; introducing said stripped catalyst stream into a regeneration zone and therein removing combustible deposits from the catalyst by combustion thereof in the presence of an oxygen-containing gas; supplying thus regenerated catalyst to said reaction zone; removing substantially oxygen-free combustion gases formed in said regeneration zone; and supplying at least a portion of said last named gases to said stripping zone for countercurrent contact with catalyst therein as hereinbefore described.

2. A hydrocarbon conversion process which comprises subjecting a hydrocarbon charge to conversion conditions in the presence of a solid catalyst in a reaction zone; introducing the resultant conversion products into a fractionation zone and therein separating a naphtha fraction; withdrawing contaminated catalyst from the reaction zone and introducing the same into a separate stripping zone; contacting said naphtha fraction with said contaminated catalyst in said stripping zone to displace high boiling hydrocarbons from the contaminated catalyst; separately withdrawing from said stripping zone the stripped catalyst and the naphtha fraction containing displaced high boiling hydrocarbons; introducing the latter into said fractionation zone without passage thereof through said reaction zone; introducing said stripped catalyst into a regeneration zone and therein removing combustible contaminants from the catalyst; and returning resultant regenerated catalyst to said reaction zone.

3. The process of claim 2 further characterized in that said hydrocarbon charge is cracked in the presence of a solid cracking catalyst.

4. The process of claim 2 further characterized in that said hydrocarbon charge is dehydrogenated in the presence of a solid dehydrogenation catalyst.

5. The process of claim 2 further characterized in that said hydrocarbon charge comprises a straight run gasoline and said gasoline is reformed in the presence of a solid reforming catalyst.

6. The process of claim 2 further characterized in that said hydrocarbon charge comprises a topped crude and said topped crude is cracked in the presence of a solid cracking catalyst.

7. A hydrocarbon conversion process which comprises subjecting a hydrocarbon charge to conversion conditions in the presence of a solid catalyst in a reaction zone; introducing the resultant conversion products into a fractionating zone and therein separating a naphtha fraction; withdrawing contaminated catalyst from the reaction zone and introducing the same into a separate stripping zone; contacting said naphtha fraction with said contaminated catalyst in said stripping zone to displace high boiling hydrocarbons from the contaminated catalyst; subsequently passing said contaminated catalyst in countercurrent contact with substantially oxygen-free combustion gases in said stripping zone; separately withdrawing from said stripping zone the stripped catalyst and the naphtha fraction containing displaced high boiling hydrocarbons; introducing the latter into said fractionation zone without passage thereof through said reaction zone; introducing said stripped catalyst into a regeneration zone and therein removing combustible contaminants from the catalyst; and returning resultant regenerated catalyst to said reaction zone.

DAVIS READ, Jr.

REFERENCES CITED

The following references are of record in the file of this patent:

UNITED STATES PATENTS

| Number | Name | Date |
|---|---|---|
| 1,908,338 | Franceway | May 9, 1933 |
| 1,972,948 | Payne | Sept. 11, 1934 |
| 2,057,402 | Tropsch | Oct. 13, 1936 |
| 2,259,486 | Carpenter | Oct. 21, 1941 |
| 2,300,240 | Thomas | Oct. 27, 1942 |
| 2,302,209 | Goddin, Jr. | Nov. 17, 1942 |
| 2,303,717 | Arveson | Dec. 1, 1942 |
| 2,333,851 | Egloff | Nov. 9, 1943 |
| 2,348,156 | Sheppard | May 2, 1944 |
| 2,385,826 | Bailey, Jr | Sept. 25, 1945 |
| 2,391,944 | Carlsmith | Jan. 1, 1946 |
| 2,414,002 | Thomas et al. | Jan. 7, 1947 |